United States Patent
Song (10) Patent No.: US 11,362,343 B2
(45) Date of Patent: Jun. 14, 2022

(54) CONNECTING MODULE OF A FUEL CELL STACK AND A REPLACEMENT METHOD OF THE FUEL CELL STACK USING THE SAME

(71) Applicants: HYUNDAI MOTOR COMPANY, Seoul (KR); KIA MOTORS CORPORATION, Seoul (KR)

(72) Inventor: Sung Weon Song, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 146 days.

(21) Appl. No.: 17/029,356

(22) Filed: Sep. 23, 2020

(65) Prior Publication Data
US 2021/0328234 A1    Oct. 21, 2021

(30) Foreign Application Priority Data
Apr. 20, 2020   (KR) .................. 10-2020-0047751

(51) Int. Cl.
| | |
|---|---|
| *H01M 8/0256* | (2016.01) |
| *H01M 8/0267* | (2016.01) |
| *H01M 8/0258* | (2016.01) |
| *H01M 8/04029* | (2016.01) |

(52) U.S. Cl.
CPC ....... *H01M 8/0256* (2013.01); *H01M 8/0258* (2013.01); *H01M 8/0267* (2013.01); *H01M 8/04029* (2013.01)

(58) Field of Classification Search
CPC ............ H01M 8/0256; H01M 8/0258; H01M 8/0267; H01M 8/04029; H01M 8/2465; H01M 8/2485; H01M 8/2475
See application file for complete search history.

(56) References Cited

U.S. PATENT DOCUMENTS

2014/0162161 A1*  6/2014  Hood .................. H01M 8/0269
                                                            439/726

* cited by examiner

*Primary Examiner* — Stewart A Fraser
(74) *Attorney, Agent, or Firm* — Lempia Summerfield Katz LLC (57) ABSTRACT

A connecting module for connecting an opening of a fuel cell stack and a nozzle introduces and discharges a fuel gas or cooling water. The connecting module includes a link part disposed adjacent to the opening of the fuel cell stack and configured to be slid leftwards and rightwards. The link part has a guide in an inclination direction. The connecting module also includes a connection part connected to the guide of the link part to be slid along the guide such that the connection part is moved forwards and rearwards during a leftward and rightward sliding operation of the link part. The connection part is configured to be coupled to the opening of the fuel cell stack when being moved forwards and to deviate from the opening of the fuel cell stack when being moved rearwards.

17 Claims, 7 Drawing Sheets

CONNECTING MODULE OF A FUEL CELL STACK AND A REPLACEMENT METHOD OF THE FUEL CELL STACK USING THE SAME

CROSS REFERENCE TO RELATED APPLICATION

The present application claims priority to Korean Patent Application No. 10-2020-0047751, filed Apr. 20, 2020, the entire contents of which are incorporated herein for all purposes by this reference.

BACKGROUND

1. Field of the Disclosure

The present disclosure is a connecting module of a fuel cell stack that is detachably connected to an opening of the fuel cell stack, through which a fuel gas or cooling water is introduced and discharged, to connect the fuel cell stack and a balance-of-plant (BOP). Thus, exchange or replacement of the fuel cell stack may be facilitated if necessary.

2. Description of the Prior Art

A fuel cell is a device that produces electric power by directly converting a fuel to electricity through an electrochemical reaction. The fuel cell has been spotlighted as a next-generation energy source because the efficiency of the fuel cell is more excellent than an existing energy source and the fuel cell hardly discharges harmful substances.

A fuel cell system produces electricity and water while hydrogen supplied to an anode is separated into hydrogen ions and electrons and the hydrogen ions travel to a cathode through an electrolyte layer. In order to operate a fuel cell system, it is necessary to supply hydrogen and oxygen that are fuel gases. Further, because a reaction generated in the fuel cell stack is an exothermic reaction, cooling water for cooling the fuel cell stack is introduced into the fuel cell stack.

The fuel cell system is classified into a fuel cell stack that produces electricity and a balance-of-plant (BOP). The BOP includes devices, such as a pump, a blower, a sensor, and a valve. The BOP devices adjust humidification and cooling of an air blower that supplies air to the fuel cell stack and a hydrogen recirculation system and that recover and discharge wasted heat. The BOP is connected to the fuel cell to supply or recover the fuel gas or the cooling water.

The performance of the fuel cell system is determined by the fuel cell stack. In the fuel cell system according to the conventional technology, because the fuel cell stack and the BOP are connected to each other by various pipelines and valves, the structure thereof is complex. Also, it is difficult to connect or separate the fuel cell stack and the BOP. Accordingly, if the fuel cell stack is aged or the life span of the fuel cell stack expires, the entire system has to be exchanged regardless of a failure of the BOP. The problems cause a result of deteriorating the efficiency of the fuel cell system and increasing manufacturing costs.

SUMMARY

Accordingly, development of a connecting module that allows a fuel cell stack to be easily replaced, by detachably connecting a BOP and the fuel cell stack is necessary.

The present disclosure has been suggested to solve the above problems and provides a connecting module that allows a fuel cell stack to be easily replaced if the fuel cell stack is aged or the life span of the fuel cell stack expires, by detachably connecting an opening of the fuel cell stack and a nozzle of a balance-of-plant (BOP).

In accordance with an aspect of the present disclosure, a connecting module for connecting an opening of a fuel cell stack and a nozzle to introduce and discharge a fuel gas or cooling water is provided. The connecting module includes: a link part disposed adjacent to the opening of the fuel cell stack, configured to be slid leftwards and rightwards, and having a guide in an inclination direction. The connecting module also includes a connection part connected to the guide of the link part to be slid along the guide such that the connection part is moved forwards and rearwards during a leftward and rightward sliding operation of the link part. The connection part is configured to be coupled to the opening of the fuel cell stack when being moved forwards and to deviate from the opening of the fuel cell stack when being moved rearwards.

Further, the connecting module may further include a housing accommodating the link part and the connection part in an interior of the housing. The housing may be configured to be attached to and detached from the fuel cell stack by the link part to facilitate exchange of the fuel cell stack.

A portion of the link part may be formed to protrude to opposite sides of the housing while the link part is slid leftwards and rightwards such that the fuel cell stack and the housing are connected to each other by inserting the link part into the fuel cell stack.

The connecting module may further include a handle connected to the link part to be rotatable such that the link part is manipulated to be slid.

The link part may include an upper link and a lower link, and the guide is provided in each of the upper link and the lower link. The connection part may be located between the upper link and the lower link to be moved forwards and rearwards as the upper link and the lower link are slid.

A protrusion may be formed on a side surface of each of the upper link and the lower link of the link part and the protrusion may be inserted into the fuel cell stack to be connected to the fuel cell stack when the link part is slid.

The upper link and the lower link may have symmetrical shapes and are slidable in opposite directions. The shapes of the guides of the upper link and the lower link may be symmetrical to each other such that the connection part is moved forwards and rearwards.

Further, rack gears may be formed on facing surfaces of the upper link and the lower link. The connecting module further may include a handle including a pinion gear connected to and disposed between the rack gears of the upper link and the lower link to manipulate the upper link and the lower link such that the upper link and the lower link are slid in opposite directions.

A plurality of guides corresponding to the openings of the fuel cell stack, respectively, may be provided in the link part. The connection part may include a plurality of pipes having shapes corresponding to the openings of the fuel cell stack. Coupling parts that extend upwards and downwards to be inserted into and coupled to the guides may be formed in the pipes and may be rotated together with the link part.

The guides may have different shapes according to the openings of the fuel cell stack corresponding thereto.

Opposite ends of each of the guide may extend leftwards and rightwards.

The guide may include a displacement securing section extending from one end of the guide to an opposite end of the guide in an inclination direction at a predetermined angle and a force securing section formed to extend as the inclination of the guide is decreased at the opposite end of the guide.

The connection part may include a hydrogen introduction pipe, a hydrogen discharging pipe, an air introducing pipe, an air discharging pipe, a cooling water introducing pipe, and a cooling water discharging pipe.

Further, the connecting module may further include a locking device configured to fix the link part such that the link part is not slid.

Because the connecting module of a fuel cell stack according to the present disclosure is detachably connected to the fuel cell stack such that the fuel cell stack may be easily replaced, it is easy to manage and maintain the system.

Further, the connecting module can be easily manufactured and used with a simple structure and can prevent leakage of water because it may be physically coupled to the fuel cell stack.

Further, the nozzles and the openings can be firmly connected to each other by allowing the suitable guides to correspond to the openings according to the kinds of the openings, and a displacement and a force can be secured by variously determining the shapes of the guides.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EMBODIMENTS

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments are illustrated in the drawings and described in the specification or application. However, it should be understood that embodiments according to the concept of the present disclosure are not limited to the particularly-disclosed embodiments. The present disclosure includes all modifications, equivalents, and alternatives falling within the spirit and scope of the present disclosure.

It should be understood that when an element is referred to as being "connected" or "coupled" to another element, it may be directly connected or coupled directly to the other element or any other element may be interposer between them. In contrast, it should be understood that when an element is referred to as being "directly connected," or "directly coupled" to another element, there are no element interposed between them. Other expression used to describe the relationship between elements, for example, the expressions "between", "directly between", "adjacent to", "directly adjacent to", and the like should also be interpreted in the same way.

Hereinafter, in order to describe the present disclosure in detail, specific embodiments of the present disclosure are described with reference to the accompanying drawings. The same reference numerals suggested in the drawings denote the same or equivalent members.

A fuel cell is an energy conversion apparatus that is consistently supplied with a fuel from the outside and directly converts chemical energy to electrical energy by removing a product. A balance-of-plant (BOP) that constitutes a fuel cell system refers to an apparatus, such as a hydrogen supply system, an air supply system, a cooling module, and a humidifier.

The life span of a fuel cell system for power generation is determined by a fuel cell stack 20. Until now, because the entire fuel cell system has to be exchanged if the life span of the fuel cell stack 20 expires, there has been a limit that exchange or replacement costs are high and the exchange process thereof is complex.

The present disclosure relates to a connecting module 10 that connects a fuel cell stack 20 and a balance-of-plant (BOP). According to the present disclosure, a connecting module 10, which connects a fuel cell stack 20, and a nozzle of a BOP are attached to and detached from each other through a simple manipulation. Thus, the fuel cell stack 20 can be simply exchanged.

Figure 1:
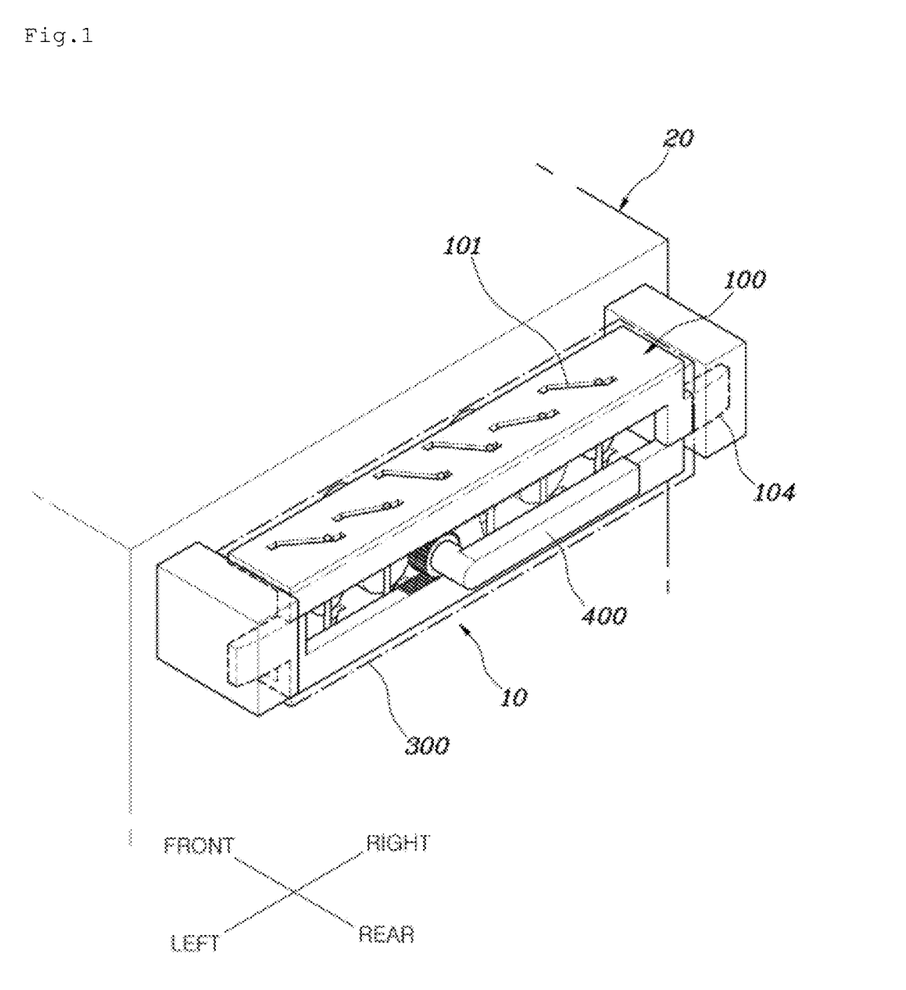
FIGS. 1 and 2 are perspective views of a connecting module of a fuel cell stack according to an embodiment of the present disclosure.
Figure 2:
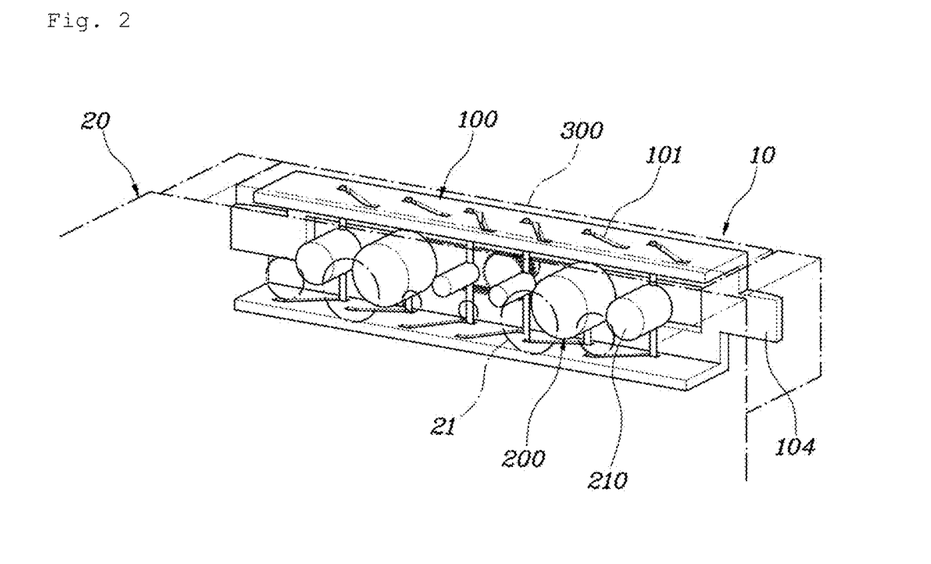

FIGS. 1 and 2 are perspective views of a connecting module 10 of a fuel cell stack 20 according to an embodiment of the present disclosure. FIGS. 1 and 2 are perspective views of opposite sides in a state in which the connecting module 10 is connected to the fuel cell stack 20.

Referring to FIGS. 1 and 2, the connecting module 10 of the fuel cell stack 20 according to the embodiment of the present disclosure may include a link part 100 and a connection part 200.

The link part 100 may perform a function of connecting the connecting module 10 of the fuel cell stack 20 to the fuel cell stack 20. The link part 100 may be disposed adjacent to an opening 21, through which fluid is introduced into and discharged from the fuel cell stack 20. The link part 100 may be connected to the fuel cell stack 20 while being slid leftwards and rightwards.

As the link part 100 is slid leftwards and rightwards to be connected to or separated from the fuel cell stack 20, the connecting module 10 of the fuel cell stack 20 according to the present disclosure may be detachably connected to the fuel cell stack 20.

A guide 101 may be formed in the link part 100 in an inclination direction. The link part 100 may be slid leftwards and rightwards, and the guide 101 may be formed in the inclination direction such that the connecting part 200 that may be rotated together with the link part 100 is moved forwards and rearwards. Because the connection part 200, which is described below, is connected to the guide 101 such that the connection part 200 is moved forwards and rearwards, the guide 101 may perform a function of connecting or separating the opening 21 of the fuel cell stack 20 and the connection part 200.

The connection part 200 may connect the nozzle of the BOP and the opening 21 of the fuel cell stack 20 to define a passage, through which fluid flows. In other words, one end of the connection part 200 may be connected to the nozzle of the BOP, and an opposite end of the connection part 200 may be moved forwards and rearwards to be connected to or separated from the opening 21 of the fuel cell stack 20.

The connection part 200 is connected to the guide 101, and a portion of the connection part 200 may be inserted into and connected to the guide 101. If the link part 100 is slid leftwards and rightwards, the connection part 200 may be rotated together with the link part 100 and be moved forwards and rearwards.

If the connection part 200 is moved forwards, it is coupled to the opening 21 of the fuel cell stack 20 and connects the nozzle of the BOP and the opening 21 of the fuel cell stack 20. In contrast, if the connection part 200 is moved rearwards, it is separated from the opening 21 of the fuel cell stack 20 and separates the nozzle of the BOP and the opening 21 of the fuel cell stack 20.

Further, referring to FIGS. 1 and 2, the connecting module 10 of the fuel cell stack 20 according to the embodiment of the present disclosure may further include a housing 300. The link part 100 and the connection part 200 may be accommodated in the housing 300. The housing 300 is configured to be attached to and detached from the fuel cell stack 20 by the link part 100 such that the fuel cell stack 20 is easily replaced if the life span of the fuel cell stack 20 expires.

The link part 100 may include a protrusion 104, portions of which protrude to opposite sides of the housing 300 while the link part 100 is slid leftwards and rightwards. The protruding link part 100 is inserted into and coupled to the fuel cell stack 20 and connects the housing 300 and the fuel cell stack 20.

Further, referring to FIGS. 1 and 2, the connecting module 10 of the fuel cell stack 20 according to the embodiment of the present disclosure may further include a handle 400. The handle 400 is a device that is connected to the link part 100 to be rotatable such that the link part 100 is slid. The handle 400 may be manually manipulated or may be electrically connected to a driving device such as a motor to be automatically manipulated.

Figure 3:
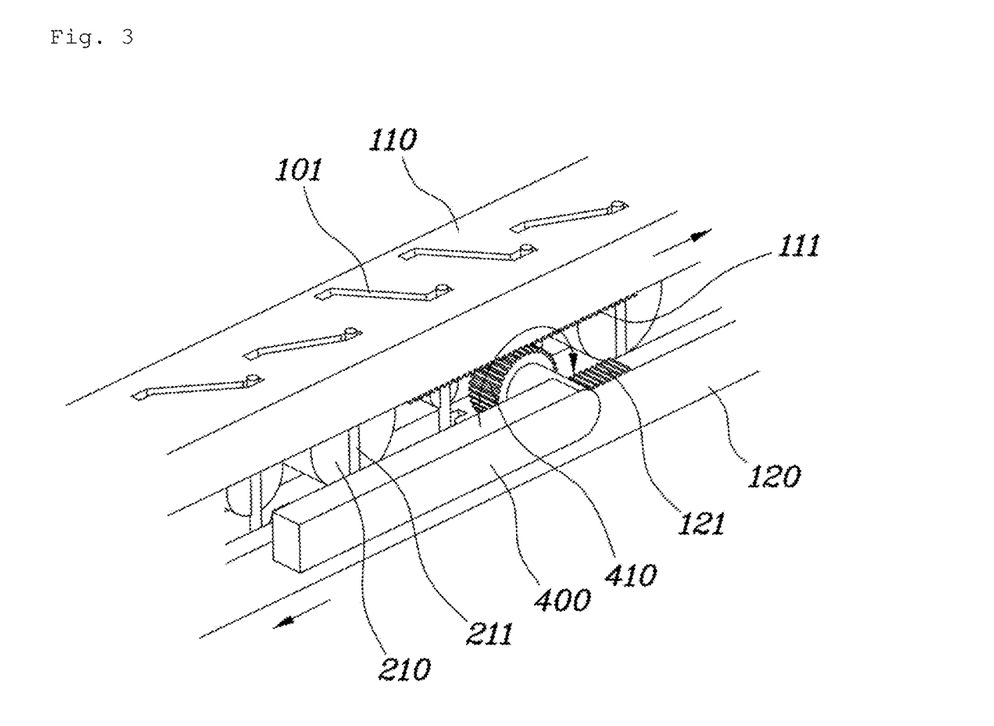
FIG. 3 is a perspective view of a link part and a connection part of the connecting module of the fuel cell stack according to the embodiment of the present disclosure.
Figure 4:
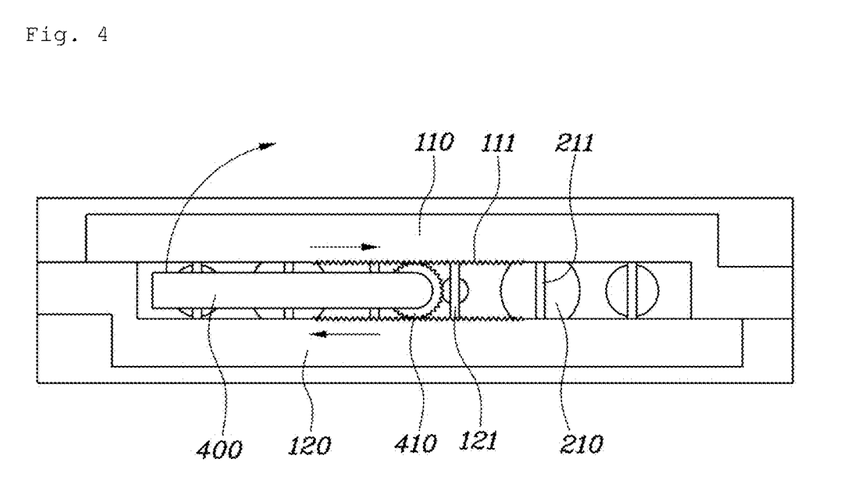
FIG. 4 is a front view of the link part and the connection part of the connecting module of the fuel cell stack according to the embodiment of the present disclosure.

FIG. 3 is a perspective view of a link part 100 and a connection part 200 of the connecting module 10 of the fuel cell stack 20 according to the embodiment of the present disclosure. FIG. 4 is a front view of the link part 100 and the connection part 200 of the connecting module 10 of the fuel cell stack 20 according to the embodiment of the present disclosure.

Referring to FIGS. 3 and 4, the link part 100 of the connecting module 10 of the fuel cell stack 20 according to the embodiment of the present disclosure may include an upper link 110 and a lower link 120 that are spaced apart from each other upwards and downwards. A connection part 200 may be located in a space between the upper link 110 and the lower link 120, which are spaced apart from each other. If the upper link 110 and the lower link 120 are slid leftwards and rightwards, the connection part 200 provided therebetween may be moved forwards and rearwards. In order that the driving part, i.e., the connection part 200, is moved forwards and rearwards as the upper link 110 and the lower link 120 are slid, the guides 101 may be provided in the upper link 110 and the lower link 120.

Protrusions 104 protrude leftwards and rightwards from side surfaces of the upper link 110 and the lower link 120. If the link part 100 is slid, the protrusions 104 of the upper link 110 and the lower link 120 may be inserted into and coupled to the fuel cell stack 20.

Because the housing 300 may be firmly connected to the fuel cell stack 20 as the protrusions 104 are physically coupled to the fuel cell stack 20, the BOP and the fuel cell stack 20 may be stably connected to each other even during an operation of the fuel cell stack 20.

Referring to FIGS. 3 and 4, the upper link 110 and the lower link 120 may have symmetrical shapes. Accordingly, the upper link 110 and the lower link 120 may be slid in opposite directions. For example, as illustrated in FIG. 3, the upper link 110 may be slid rightwards and the lower link 120 may be slid leftwards. In order that the connection part 200 may be moved forwards and rearwards as the upper link 110 and the lower link 120 are slid in opposite directions, the guides 101 are formed in inclination directions and may be formed to be symmetrical to each other. As illustrated in FIGS. 1 and 2, the guide 101 of the upper link 110 and the guide 101 of the lower link 120 may have forms that are rotated by 90 degrees with respect to each other. Accordingly, the leftward/rightward movement of the link part 100 may be converted to the forward/rearward movement of the connection part 200.

Referring to FIG. 4, the lower surface of the upper link 110 and the upper surface of the lower link 120, i.e., the facing surfaces of the upper link 110 and the lower link 120 may have rack gears 111 and 121. Further, a pinion gear 410 may be provided between the rack gears 111 and 121 to be connected to the rack gears 111 and 121. The rack gears 111 and 121 and a pinion gear 410 are engaged to be rotated with respect to each other to convert a rotation to a linear movement.

The pinion gear 410 may be connected to the handle 400. As the handle 400 is rotated, the pinion gear 410 is rotated together, and the upper link 110 and the lower link 120 are slid in opposite directions by the rack gears 111 and 121 engaged with the pinion gear 410. Because the link part 100 has a structure that is slid leftwards and rightwards, it may be connected to or separated from the fuel cell stack 20 through a simple manipulation.

Figure 6:
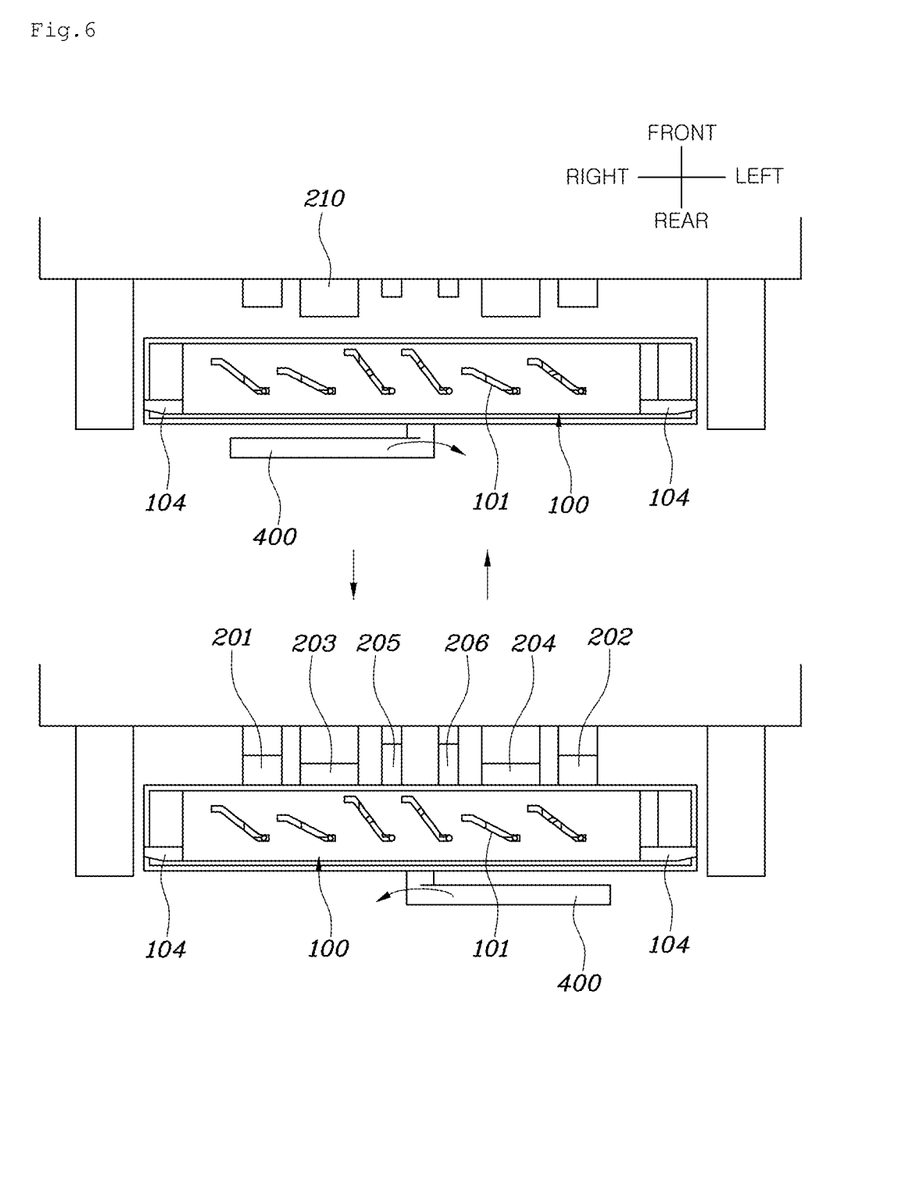
FIG. 6 is a view illustrating a state in which the connecting module of the fuel cell stack is coupled to or separated from the fuel cell stack according to the embodiment of the present disclosure.

FIG. 6 is a view illustrating a state in which the connecting module 10 of the fuel cell stack 20 is coupled to or separated from the fuel cell stack 20 according to the embodiment of the present disclosure.

Referring to FIG. 6, the connection part 200 may include a plurality of pipes 210. In more detail, the connection part 200 may include a hydrogen introduction pipe 205, a hydrogen discharging pipe 206, an air introducing pipe 203, an air discharging pipe 204, a cooling water introducing pipe 201, and a cooling water discharging pipe 202.

The hydrogen introducing pipe 205 is a passage, through which a hydrogen gas flows to be introduced into the fuel cell stack 20, and the hydrogen discharging pipe is a passage, through which the hydrogen gas flows to be discharged from the fuel cell stack 20.

The air introducing pipe 203 is a passage, through which air containing an oxygen gas flows to be introduced into the fuel cell stack 20, and the air discharging pipe 204 is a passage, through which the air containing an oxygen gas flows to be discharged to the outside of the fuel cell stack 20.

The cooling water introducing pipe 201 is a passage, through which cooling water that cools the fuel cell stack 20 is introduced into the fuel cell stack 20, and the cooling water discharging pipe 202 is a passage, through which the cooling water heated by the fuel cell stack is discharged.

A plurality of fluids is introduced into and discharged from the fuel cell stack 20. Separate openings 21 are formed in the fuel cell stack 20 such that the plurality of fluids does not mix. Accordingly, the connection part 200 includes a plurality of pipes 210 having shapes corresponding to the openings 21 of the fuel cell stack 20. The corresponding shapes refer to shapes that are suitable for sealing the openings 21 by inserting the plurality of pipes 210 into the openings 21 such that the shapes and the diameters of the plurality of pipes 210 correspond to the shapes and the diameters of the openings.

A plurality of guides 101 may be provided to correspond to the openings 21 of the fuel cell stack 20. Corresponding pipes 210 may be connected to the guides 101, respectively. Each of the pipes 210 may have a coupling part 211 that extends upwards and downwards and is inserted into the corresponding guide 101. The coupling parts 211 are inserted into the guides 101 whereby the guides 101 and the pipes 210 are connected to each other, and the pipes 210 may be moved forwards and rearwards as the coupling parts 211 are slid along the guides 101. Because the guides 101 and the pipes 210 may be coupled to each other to be moved with the simple structures such as the coupling parts 211, the connecting module can be easily manufactured.

Referring to FIG. 6, as the link part 100 is slid leftwards and rightwards, the pipes 210 connected to the guides 101 are moved forwards and rearwards. By manipulating the handle 400, as described above, the upper link 110 and the lower link 120 may be slid in opposite directions through the engagement of the rack gears 111 and 121 and the pinion gears 410.

Because the pipes 210 has shapes corresponding to the openings 21, respectively, they are inserted into the corresponding openings 21 to seal the openings 21. One end of the pipe 210 is connected to the nozzle of the BOP and functions as a passage, through which the fluid flows. The BOP and the fuel cell stack 20 may be connected to each other by connecting an opposite end of the pipe 210 to the opening 21.

Figure 5:
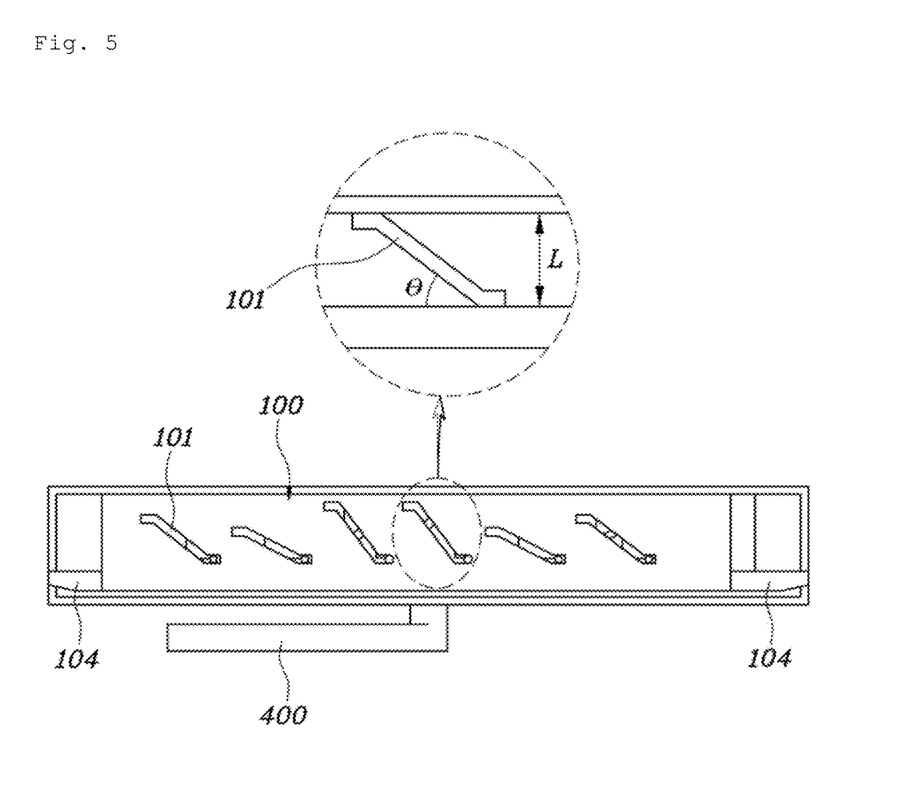
FIG. 5 is a front view of the link part and guides of the connecting module of the fuel cell stack according to the embodiment of the present disclosure.

FIG. 5 is a view of the link part 100 and the guides 101 of the connecting module 10 of the fuel cell stack 20 according to the embodiment of the present disclosure.

Referring to FIG. 5, the guides 101 may have different shapes. Because the openings 21 corresponding to the guides 101 are different, the guides 101 may have different shapes according to the openings 21.

The guides 101 are formed in inclination directions, and the displacement L, by which the pipes 210 of the connection part 200 are moved forwards and rearwards, may vary according to the angle θ defined by the guides 101. As the angle θ defined by the guides 101 with respect to the leftward/rightward direction, in which the link part 100 is slid, increases, the displacement L, by which the connection part 200 is moved forwards and rearwards, also increases.

In contrast, as the angle θ of the guides 101 is smaller, the displacement L, by which the connection part 200 is moved forwards and downwards, decreases. Accordingly, because the openings 21 are formed to define proper angles, respectively, according to the distances, by which the openings 21 are spaced apart from the connection part 200, the plurality of guides 101 may be formed in inclination directions while defining different angles θ.

Further, referring to FIGS. 1 to 6, the opposite ends of the guide 101 may be formed in the leftward/rightward direction, in which the link part 100 is slid. When the connecting module 10 of the fuel cell stack 20 of the present disclosure is connected to the fuel cell, the connection part 200 is inserted into and coupled to the opening 21 of the fuel cell. Accordingly, a force for inserting the connection part 200 into the opening 21 is necessary. In contrast, when the connection part 200 has to be extracted from the opening 21 when the connecting module 10 of the fuel cell stack 20 is to be separated from the fuel cell, an extraction force is necessary. Because opposite ends of the guide 101 is formed in the leftward/rightward direction, a force for inserting or extracting the connection part 200 connected to the guide 101 may be provided while the link part 100 is slid leftwards and rightwards.

Figure 7:
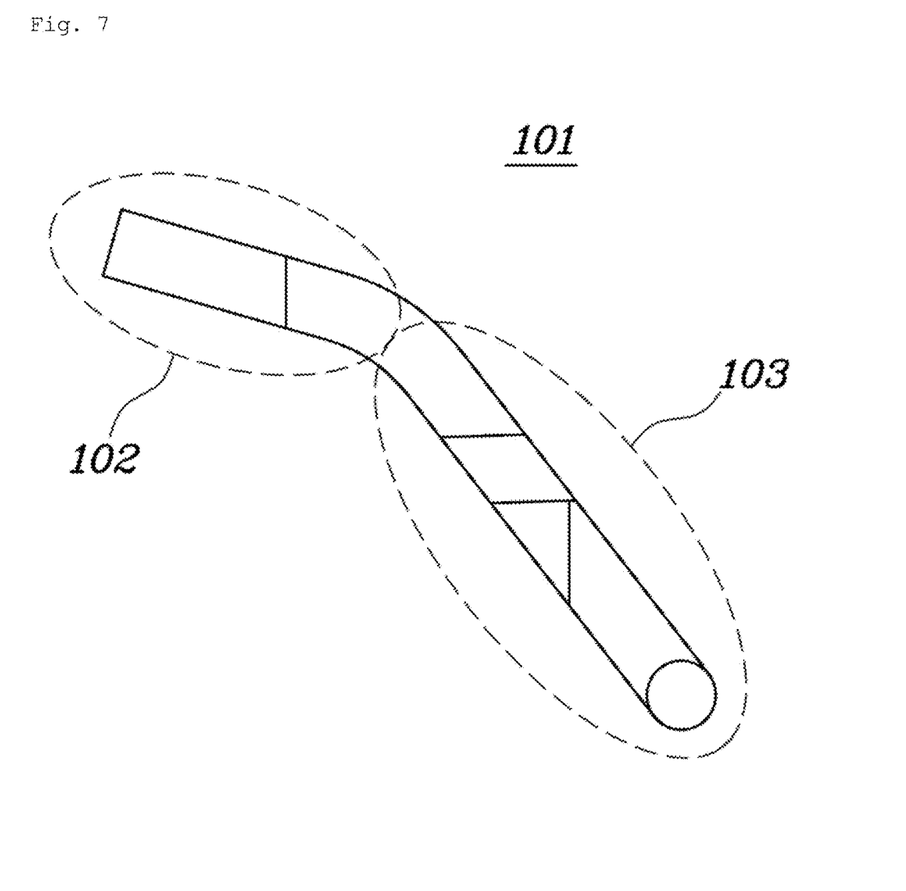
FIG. 7 is a view illustrating the shapes of the guides of the fuel cell stack according to another embodiment of the present disclosure.

FIG. 7 is a view illustrating the shapes of the guides 101 of the fuel cell stack 20 according to another embodiment of the present disclosure.

Referring to FIG. 7, in order to make the movement of the connection part 200 smooth and natural, the guide 101 may have a displacement securing section 103 extending from one end to an opposite end thereof in an inclination direction and a force securing section 102 formed to extend as the inclination of the guide is decreased at the opposite end thereof. The displacement securing section 103 and the force securing section 102 may be variably formed according to the shape, the purpose, and the size of the opening 21.

In the initial section, the displacement, by which the connection part 200 may be moved, may be secured by making the angle of the displacement securing section 103 large. In the later section, a force for connection with the opening can be secured by reducing the angle.

The length, by which the connection part 200 is moved forwards and rearwards, may be secured by the displacement securing section 103, and the force for inserting or separating the connection part 200 into or from the opening can be secured by the force securing section 102.

Further, the connecting module 10 of the fuel cell stack 20 according to the embodiment of the present disclosure may further include a locking device (not illustrated) for fixing the link part 100. A locking device (not illustrated) that fixes the link part 100 such that the link part 100 is not slid is provided to be maintained in a state in which the link part 100 is fixed to the fuel cell stack 20.

Although particular embodiments of the present disclosure have been shown and described above, it should be apparent to those having ordinary skill in the art that various modifications and changes may be made to the present disclosure without departing from the technical idea of the present disclosure defined by the appended claims.

What is claimed is:
1. A connecting module for connecting an opening of a fuel cell stack and a nozzle to introduce and discharge a fuel gas or cooling water, the connecting module comprising:
    a link part disposed adjacent to the opening of the fuel cell stack, configured to be slid leftwards and rightwards, and having a guide; and
    a connection part connected to the guide of the link part to be slid along the guide such that the connection part is moved forwards and rearwards during a leftward and rightward sliding operation of the link part, and configured to be coupled to the opening of the fuel cell stack when being moved forwards and to deviate from the opening of the fuel cell stack when being moved rearwards.

2. The connecting module of claim 1, further comprising:
a housing accommodating the link part and the connection part in an interior of the housing, the housing configured to be attached to and detached from the fuel cell stack by the link part to facilitate exchange of the fuel cell stack.

3. The connecting module of claim 2, wherein a portion of the link part is formed to protrude to opposite sides of the housing while the link part is slid leftwards and rightwards such that the fuel cell stack and the housing are connected to each other by inserting the link part into the fuel cell stack.

4. The connecting module of claim 1, further comprising:
a handle connected to the link part to be rotatable such that the link part is manipulated to be slid.

5. The connecting module of claim 1, wherein the link part comprises an upper link and a lower link, and the guide is provided in each of the upper link and the lower link, and the connection part is located between the upper link and the lower link to be moved forwards and rearwards as the upper link and the lower link are slid.

6. The connecting module of claim 5, wherein a protrusion is formed on a side surface of each of the upper link and the lower link of the link part and the protrusion is inserted into the fuel cell stack to be connected to the fuel cell stack when the link part is slid.

7. The connecting module of claim 5, wherein the upper link and the lower link have symmetrical shapes and are slidable in opposite directions, and the shapes of the guides of the upper link and the lower link are symmetrical to each other such that the connection part is moved forwards and rearwards.

8. The connecting module of claim 7, wherein rack gears are formed on facing surfaces of the upper link and the lower link, and
wherein the connecting module further comprises a handle comprising a pinion gear connected to and disposed between the rack gears of the upper link and the lower link to manipulate the upper link and the lower link such that the upper link and the lower link are slid in opposite directions.

9. The connecting module of claim 1, wherein a plurality of guides corresponding to the openings of the fuel cell stack, respectively, are provided in the link part, and
wherein the connection part comprises a plurality of pipes having shapes corresponding to the openings of the fuel cell stack, and coupling parts that extend upwards and downwards to be inserted into and coupled to the guides are formed in the pipes and are rotated together with the link part.

10. The connecting module of claim 9, wherein the guides have different shapes according to the openings of the fuel cell stack corresponding thereto.

11. The connecting module of claim 1, wherein opposite ends of each of the guide extend leftwards and rightwards.

12. The connecting module of claim 11, wherein the guide comprises a displacement securing section extending from one end of the guide to an opposite end of the guide in an inclination direction at a predetermined angle and a force securing section formed to extend as the inclination of the guide is decreased at the opposite end of the guide.

13. The connecting module of claim 1, wherein the connecting part comprises at least one introducing or discharging pipe of hydrogen or air or cooling water.

14. The connecting module of claim 1, further comprising:
a locking device configured to fix the link part such that the link part is not slid.

15. The connecting module of claim 1, wherein the guide of the link part is formed in an inclination direction.

16. The connecting module of claim 1, wherein the plurality of guides are formed in inclination directions while defining different angles.

17. A replacement method of the fuel cell stack using the connecting module of the fuel cell stack of claim 1, the replacement method comprising,
separating the connection part from the opening of the fuel cell stack through the operation of the link part;
replacing the fuel cell stack deviated from the connection part with a new fuel cell stack; and
coupling the connection part to the opening of the new fuel cell stack through the operation of the link part.

* * * * *